US008558864B1

(12) United States Patent
Koller et al.

(10) Patent No.: US 8,558,864 B1
(45) Date of Patent: Oct. 15, 2013

(54) IDENTIFYING VIDEO CONFERENCE PARTICIPANTS

(75) Inventors: Gary Duane Koller, Overland Park, KS (US); Mark Douglas Peden, Olathe, KS (US); Raymond Emilio Reeves, Olathe, KS (US); Piyush Jethwa, Overland Park, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 332 days.

(21) Appl. No.: 12/902,538

(22) Filed: Oct. 12, 2010

(51) Int. Cl.
*H04N 7/14* (2006.01)

(52) U.S. Cl.
USPC ........................................ 348/14.01; 455/416

(58) Field of Classification Search
USPC .............................. 348/14.01–14.08; 455/416
See application file for complete search history.

(56) References Cited

U.S. PATENT DOCUMENTS

| 2003/0058227 | A1* | 3/2003 | Hara et al. ..................... 345/178 |
| 2006/0111962 | A1* | 5/2006 | Holsinger ....................... 705/10 |
| 2007/0188596 | A1* | 8/2007 | Kenoyer .................... 348/14.08 |
| 2008/0088698 | A1  | 4/2008 | Patel et al. |
| 2008/0097851 | A1* | 4/2008 | Bemmel et al. ................. 705/14 |
| 2012/0050108 | A1* | 3/2012 | Whiting et al. ............... 342/452 |

* cited by examiner

Primary Examiner — Maria El-Zoobi (57) ABSTRACT

A method, system, and medium are provided for identifying participants of video conference sessions. One embodiment of the method includes receiving enhanced video content that identifies one or more participants at a particular location of a video conference session. Each participant may be associated with a mobile device. Video conference participants are identified based on wireless communications from the mobile device, which has an electronic module, that is associated with the corresponding participant. The enhanced video content is displayed on a display screen. Such enhanced video content includes video content captured by a video camera that is aggregated with participant data that provides an indication of at least one participant.

20 Claims, 5 Drawing Sheets

IDENTIFYING VIDEO CONFERENCE PARTICIPANTS

SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, identifying participants of a video conference. In this regard, participants of a video conference are identified such that video conference participants at another location can view participant data identifying or describing the remote participants.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended for the purpose of providing an easy methodology of communicating the ideas expressed herein and are not meant to limit the scope of the present invention. The following is a list of these acronyms:

| | |
|---|---|
| 3G | Third-Generation Wireless Telephone Technology |
| 4G | Fourth-Generation Wireless Telephone Technology |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GPRS | General Packet Radio Service |
| GSM | Global System for Mobile Communications |
| iDEN | Integrated Digital Enhanced Network |
| NFC | Near Field Communication |
| PC | Personal Computer |
| PCS | Personal Communications Service |
| PDA | Personal Digital Assistant |
| RAM | Random Access Memory |
| RFID | Radio Frequency Identification |
| ROM | Read Only Memory |
| TDMA | Time Division Multiple Access |
| UMTS | Universal Mobile Telecommunications Systems |
| WiMAX | Worldwide Interoperability for Microwave Access |

Further, various technical terms are used throughout this description. An illustrative resource that fleshes out various aspects of these terms can be found in Newton's Telecom Dictionary by H. Newton, $24^{th}$ Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention are directed to identifying video conference participants. In this regard, embodiments of the present invention recognize participants of a video conference, for example, using radio frequency technology, and provide identification of the participants of the video conference via a display screen. As such, participants of a portion of a video conference can readily recognize or identify participants with whom they are communicating. By way of example only, assume that participant A residing at one location is on a video conference with participant B and participant C residing at another location. In some cases, participant A may know the names of participant B and participant C but may not know which participant is associated with which name. In other cases, participant A may not know any information regarding participant B and participant C. Embodiments of the present invention recognize participant B and participant C and display an identification or description of each participant on the display screen to enable participant A to know which of the participants is participant B and which of the participants is participant C.

Accordingly, in one aspect, the present invention is directed to one or more computer-readable media having computer-useable instructions embodied thereon for performing a method of identifying participants of video conference sessions. The method includes receiving enhanced video content that identifies one or more participants at a particular location of a video conference session. Each of the participants is associated with a mobile device, and each of the participants is identified based on wireless communications from the mobile device, having an electronic module, associated with the corresponding participant. The enhanced video content is displayed on a display screen. The enhanced video content includes video content captured by a video camera aggregated with participant data that provides an indication of at least one of the participants.

In another aspect, the present invention is directed to one or more computer-readable media having computer-useable instructions embodied thereon for performing a method of identifying participants of video conference sessions. The method includes receiving video content associated with a particular location of a video conference session, the video content including a participant image for each participant within the video content. A unique identifier and a location indicator associated with a mobile device of a participant of the video conference session is received. Based on the unique identifier, it is determined that the mobile device is not registered. A registration request to request participant data pertaining to the participant is communicated, and participant data that describes the participant is received. The participant data is utilized to provide an identification of the participant within the video content. The participant data is presented near a corresponding participant image within the video content.

In yet another aspect, the present invention one or more computer-readable media having computer-useable instructions embodied thereon for performing a method of identifying participants of video conference sessions. The method includes receiving video content associated with a first location of a video conference session. The video content includes a first participant image that represents a first participant associated with a first mobile device and a second participant image that represents a second participant associated with a second mobile device. A first unique identifier and a first location indicator associated with the first mobile device is received. A second unique identifier and a second location indicator associated with the second mobile device is also received. The video content, the first location indicator, and the second location indicator are utilized to identify that the first participant image corresponds with the first unique identifier and that the second participant image corresponds with the second unique identifier. First participant data associated with the first unique identifier is referenced, and second participant data associated with the second unique identifier is referenced. Enhanced video content is generated by overlaying the first participant data and the second participant data over the video content such that the first participant data is positioned near the first participant image and the second participant data is positioned near the second participant image. The enhanced video content is communicated to a second location of the video conference session for display.

Figure 1:
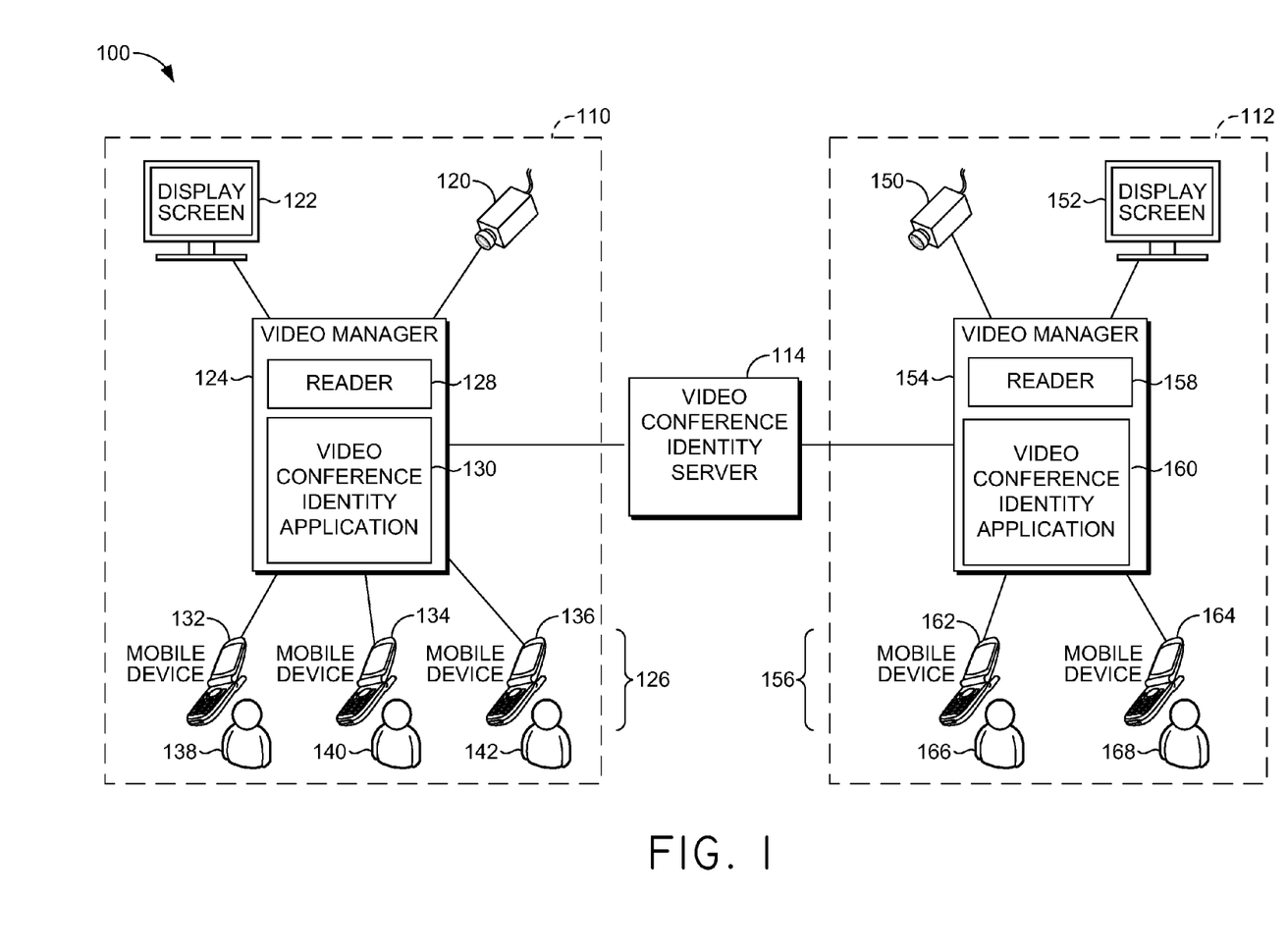
FIG. 1 is a block diagram of an exemplary computing system that is suitable for operation of an embodiment of the present invention.

Referring to the drawings generally, and initially to FIG. 1 in particular, an exemplary computing system 100 for practicing an embodiment of the present invention is provided. It will be understood and appreciated by those of ordinary skill in the art that the computing system 100 shown in FIG. 1 is merely an example of one suitable computing system and is not intended to suggest any limitation as to the scope of use or functionality of the present invention. Neither should the computing system 100 be interpreted as having any dependency or requirement related to any single component or combination of components illustrated therein. The single unit depictions are meant for clarity, not to limit the scope of embodiments in any form. For example, although a particular number of mobile devices and participants is illustrated, computing system 100 can include any number of mobile devices and participants. Further, although functionality is described with reference to particular components, as can be appreciated, any component or number of components can perform the various functions described herein. For example, in one embodiment, the video manager 124 and the video manager 154 can communicate directly with another and perform functions of the video conference identity server 114.

As shown in FIG. 1, an exemplary computing system 100 includes a remote location 110, a remote location 112, and a video conference identity server 114. The remote location 110 includes a video camera 120, a display screen 122, a video manager 124, and a set of mobile devices 126. The remote location 112 includes a video camera 150, a display screen 152, a video manager 154, and a set of mobile devices 156. The video manager 124 of the remote location 110, the video manager 154 of the remote location 112, and the video conference identity server 114 are capable of communicating via any communications network. A network(s) might comprise, for example, a cable network, the Internet, a wireless network (e.g., a wireless telecommunications network), or a combination thereof or portions thereof. A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS). A wireless telecommunications network might include an array of devices, which are not shown so as to not obscure more relevant aspects of the invention. Components such as a base station, a communications tower, or even access points (as well as other components) can provide wireless connectivity in some embodiments.

The video manager 124 of the remote location 110 and the video manager 154 of the remote location 112 are also capable of communicating with the respective sets of mobile devices 126 and 156 via any wireless communication technology. For example, the video manager 124 of the remote location 112 may communicate with the set of mobile devices 126 using radio frequency identification (RFID), Bluetooth®, near field communication (NFC), infrared, Wi-Fi™, the Internet, a wireless network, a combination thereof, or any other communication technology that enables wireless communication between the video manager 124 and the set of mobile devices 126 of the remote location 110. The video manager 154 may communicate with the set of mobile devices 156 using similar or varied communication technology.

As shown in FIG. 1, mobile devices are associated with a participant of the video conference. For example, at remote location 110, participant 138 is associated with mobile device 132, participant 140 is associated with mobile device 134, and participant 142 is associated with mobile device 136. At remote location 112, participant 166 is associated with mobile device 162 and participant 168 is associated with mobile device 164. A video conference participant, or a participant, is used herein to refer to an individual that is capable of being captured by a video camera during a video conference. By way of example only, assume that video camera 120 is set up in a conference room with three individuals dispersed around a conference table. Although the video camera 120 may be focused on only one individual at a particular time, each individual is considered a participant as the video camera 120 is capable of being directed at any of the three individuals. In some embodiments, an individual may be considered a participant if the individual is associated with a mobile device registered or capable of being registered with, for example, the video conference identity server.

The mobile devices 132, 134, 136, 162, and 164 can be any portable, wireless electronic device. A mobile device may take on a variety of forms, such as a personal computer (PC), a laptop computer, a mobile phone, a personal digital assistant (PDA), or any other device that is portable. Makers of illustrative devices include, for example, Research in Motion, Creative Technologies Corp., Samsung, Apple Computer, and the like. A mobile device can include, for example, a display(s), a power source(s) (e.g., a battery), a data store(s), a speaker(s), memory, a buffer(s), and the like. In embodiments, a mobile device comprises a wireless or mobile device with which a wireless telecommunications network is utilized for communication. In this regard, the mobile device communicates with other mobile devices using a wireless telecommunications network(s). The number of mobile devices illustrated in FIG. 1 is not intended to limit the scope of this invention. Rather, any number of mobile devices can be used in implementation.

In embodiments, the mobile devices 132, 134, 136, 162, and 164 include an electronic module (not shown) that is capable of being used to detect proximity of the mobile device relative to a reader. Such an electronic module may take on a variety of forms, such as a RFID tag or a chip, etc. A RFID tag may be active, passive, or semi-passive. An electronic module may be attached to or embedded within a mobile device.

Generally, a video manager, such as video manager 124 and video manager 154, is configured to manage a video conference occurring at a particular location. In embodiments, a video manager includes a reader and a video conference identity application. As illustrated in FIG. 1, video manager 124 includes reader 128 and video conference identity application 130, and video manager 154 includes reader 158 and video conference identity application 160. Although the video manager is described herein to include a reader and a video conference identity application, as can be appreciated, the reader and the video conference may be remotely located from one another.

A reader, such as reader 128 and reader 158, communicates with electronic modules associated with mobile devices that are within communication range of the reader (e.g., within a proximity of the reader) to detect proximity or location of mobile devices relative to the reader. Accordingly, an electronic module of a mobile device in combination with a reader is utilized to determine a location of the mobile device that is positioned within a proximity from the reader. A reader may be any reader, such as an RFID reader, that can communicate with an electronic module that can be used to detect a location of the electronic module or mobile device. In embodiments, the reader detects, searches, or scans for electronic modules, such as RFID tags. In such embodiments, the reader may transmit a signal(s) to detect electronic modules. As can be appreciated, the reader can be configured to repetitively search for a presence and/or location of an electronic module or mobile device during a video conference such that changes in location and presence can be reflected in the enhanced video content provided to a remote location.

Upon an electronic module receiving or recognizing a signal emitted from a reader, the electronic module transmits a response signal to the receiver. For example, upon an electronic module entering a proximity (e.g., a magnetic field) of a reader, an antenna in combination of radio waves may be used to transfer data to the reader. The response may include or be associated with a unique identifier that uniquely identifies the corresponding mobile device, electronic module within the mobile device, or mobile device user. Such a unique identifier may include an identity of a mobile device, a mobile device user, an electronic module, etc. As can be appreciated, a unique identifier can be any text, numerals, symbols, or the like that uniquely identify a mobile device, user, or electronic module. The video conference identity application 130 or 160 can then be utilized to communicate the response signal, including a unique identifier, to the video conference identity server 114.

In embodiments, the response signal includes a location indicator that provides an indication of a location of the mobile device or the electronic module in association therewith. A location indicator may be, by way of example and not limitation, a signal strength indicating nearness of the mobile device to a reader, a distance between the mobile device and a reader, a direction, or the like. Such a location indicator can be utilized by the video conference identity server 114 to determine a relative location of the mobile device and/or electronic module.

The video conference identity server 114 receives the response, including a unique identifier if assigned, and other data in association therewith (e.g., location indicator), and determines if the mobile device, the electronic module, or the user in association therewith is registered. In embodiments, such a determination may be made utilizing an algorithm, a lookup system, or the like. For example, a data store may contain a listing of each registered mobile device, electronic module, or user. In such a case, a unique identifier included within a response can be compared to the listing of registered items to determine if such a unique identifier is included within the data store. As can be appreciated, in some cases, a response provided by an unregistered device or user may not have any unique identifier and, accordingly, the video conference identity server 114 determines that the mobile device, electronic module, or user is not registered. In cases that the mobile device, electronic module, or user is not registered, the video conference identity server 114 communicates a registration request to the video conference identity application to be communicated to the mobile device. As can be appreciated, the video conference identity server 114 may, in some embodiments, communicate the registration request directly to the mobile device.

Upon a video conference identity application receiving a registration request from the video conference identity server 114, the video conference identity application communicates the registration request to the appropriate mobile device. In response to communicating the registration request to the mobile device, the video conference identity application receives a registration response from the mobile device and communicates such a response to the video conference identity server 114 to initiate registration of the mobile device.

A mobile device receiving a registration request can prompt a user to register the mobile device, the electronic module, or the user in association therewith, with the video conference identity server 114. A registration request may request specific information about a participant (i.e., participant data), such as, name of participant, age of participant, gender of participant, location of participant, company of participant, job title of participant, security-level associated with participant, background information of participant (e.g., hobbies, interests, job history), etc.

A registration response may be provided through various methods including, but not limited to, voice recognition; entry via a terminal associated with the video conference identity application; entry via the mobile device; a reference to such information, for example, stored in association with a network provider, a website, an account, etc.; or the like. The registration response may include participant data related to at least a portion of the specific information requested for the participant. In embodiments, the registration response may also include a unique identifier associated with the mobile device, electronic module, or user for which registration is requested. As can be appreciated, such a unique identifier can be communicated in a separate registration response, as metadata, or the like. Alternatively, a unique identifier may be assigned by the video conference identity server 114 upon receiving the registration response.

Upon the video conference identity server 114 receiving a response, registration is initiated. In embodiments, the unique identifier and/or participant data is stored in a data store (e.g., database). For example, participant data may be stored in association with the unique identifier corresponding therewith.

The video camera 120 is configured to capture video content within the remote location 110, and the video camera 150 is configured to capture video content within the remote location 112. In this regard, the video camera 120 captures video content of participant 132, participant 134, participant 136, or a combination thereof, and the video camera 150 captures video content of participant 166, participant 168, or a combination thereof. Video content captured via the video camera is transmitted to the video conference identity server 114, for example, via a video conference identity application.

The display screen 122 and the display screen 152 are configured to display video content, including enhanced video content, captured by a video camera at a remote location. For example, the display screen 122 at remote location 110 can display video content captured by the video camera 150 of remote location 112, and the display screen 152 at remote location 112 can display video content captured by the video camera 120 of remote location 110. The display screen may be any screen that can display video content, such as, for instance, a computer monitor, a television monitor, or the like.

The video conference identity server 114 is configured to register video conference participants and enhance video content to identify participants of the video conference. As previously mentioned, the video conference identity server 114 receives unique identifiers in association with an electronic module, a mobile device, or a user. In embodiments, upon receiving unique identifiers, the video conference identity server 114 uses the unique identifier to determine whether the particular electronic module, mobile device, or user is registered. If the electronic module, mobile device, or user is not registered, the video conference identity server 114 initiates registration by communicating a registration request to the mobile device, for example, via a video conference identity application. Upon receiving a registration response including participant data, a mobile device, electronic module, or a user can be registered. In this regard, the received participant data can be stored in association with a unique identifier. In some cases, even if a device or user is registered, the video conference identity server 114 may initiate verification of participant data or initiate a request to update participant data.

In addition to facilitating registration, the video conference identity server 114 enhances video content to identify participants of video conferences. In this regard, the video conference identity server 114 receives video content captured by a video camera at a particular location(s) of the video conference. The video content can be analyzed to recognize locations of participant images within the video content. A participant image refers to an image within video content that depicts a participant. For example, face or feature detection may be used to detect participant images.

The video conference identity server 114 also receives responses from mobile devices and/or electronic modules that include a unique identifier and one or more location indicators. As previously mentioned, a location indicator(s), for example, signal strength of an electronic module relative to a reader, can be utilized to determine an approximate location of a mobile device associated with a participant. As a mobile device is assumed to be near the participant, location indicators also indicate an approximate location of a participant. The video conference identity server 114 can use the location indicator(s) associated with the mobile device(s) in combination with the video content to identify which participant image corresponds with which unique identifier. In this regard, the recognized locations of participant images from the video content can be aggregated with approximate locations of the mobile devices associated with participants (i.e. as determined from location identifiers) to identify or predict which mobile device or unique identifier is associated with each participant image within the video content.

The unique identifier of each mobile device associated with a participant image within the video content can then be used to obtain participant data. For example, a unique identifier within a data store can be referenced to identify participant data associated with a particular mobile device, electronic module, or user. Such participant data, or a portion thereof, can be used to enhance video content presented to individuals partaking in the video conference at a remote location. In this regard, video content initially received from one video conference location can be overlayed with participant data to produce enhanced video content that is communicated to a second, remote location.

Enhanced video content refers to video content that is overlayed, combined, or aggregated with participant data such that video conference participants are identified on a display screen being used in a video conference. In embodiments, participant data, such as a participant name, a company of a participant, an interest of a participant, etc. is displayed in association with the participant for which it identifies. That is, participant data is presented in a location that is near the corresponding participant image within the video content.

Figure 2:
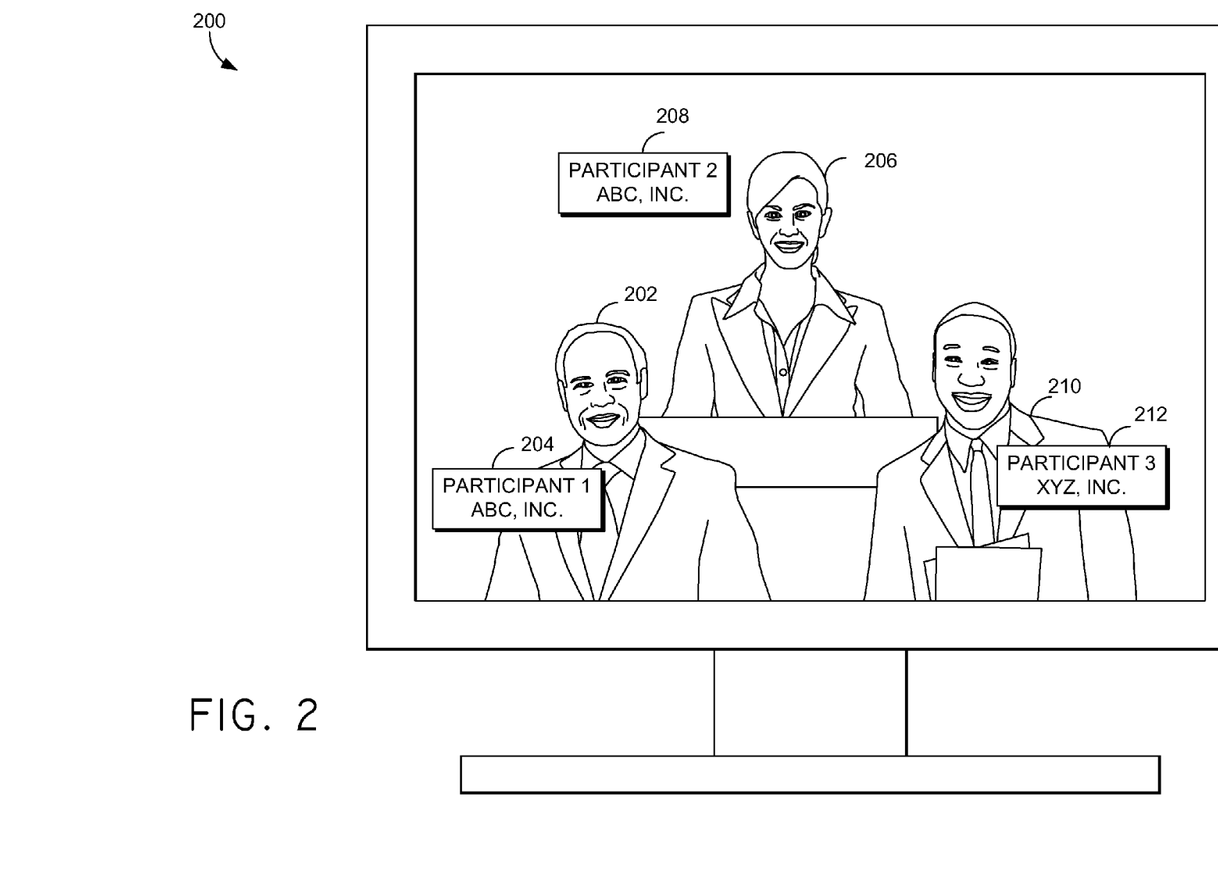
FIG. 2 provides an exemplary display screen illustrating participant data corresponding with video conference participants.

Participant data can be displayed using text, images, symbols, colors, or any other method that can be used to identify a participant or a characteristic of a participant (e.g., company at which participant is employed). For example, with reference to FIG. 2, a display screen 200 showing a video conference occurring at a remote location is illustrated. As is illustrated, participant 202 is identified by participant data 204, participant 206 is identified by participant data 208, and participant 210 is identified by participant data 212. By way of another example, an identification of a company or a group may be represented in enhanced video content. For instance, internal company participants may be identified with a red highlight while external vendor participants may be identified in a blue highlight. A security warning may also be displayed if an identified participant is not associated with a required security clearance.

The video conference identity server 114 may be configured to present participant data during an entire video conference, a portion of a video conference, upon request to display participant data (e.g., a participant may point on the display screen to request information about a particular participant), when a participant is speaking, or the like. As can be appreciated, as the video conference identity server 114 receives updated, new, or modified data from a mobile device regarding its location and/or presence, the video conference identity server 114 can update the enhanced video content to accurately reflect such data.

As can be appreciated, identification and/or location of a participant can be paired with image recognition technology to strengthen the relationship in detecting or predicting participants during a video conference session. In this regard, the video conference identity server 114 can utilize a voice profile or an image profile to assist in determining identity and/or location of a participant. Such profiles can be trained based on previous video conferences. For example, a profile can be established based on a participant of a one-to-one video conference or a one-to-many conference. In this way, because a single participant at one location is participating in the video conference, a trainer can establish or enhance a voice profile or an image profile of that particular participant.

Figure 3:
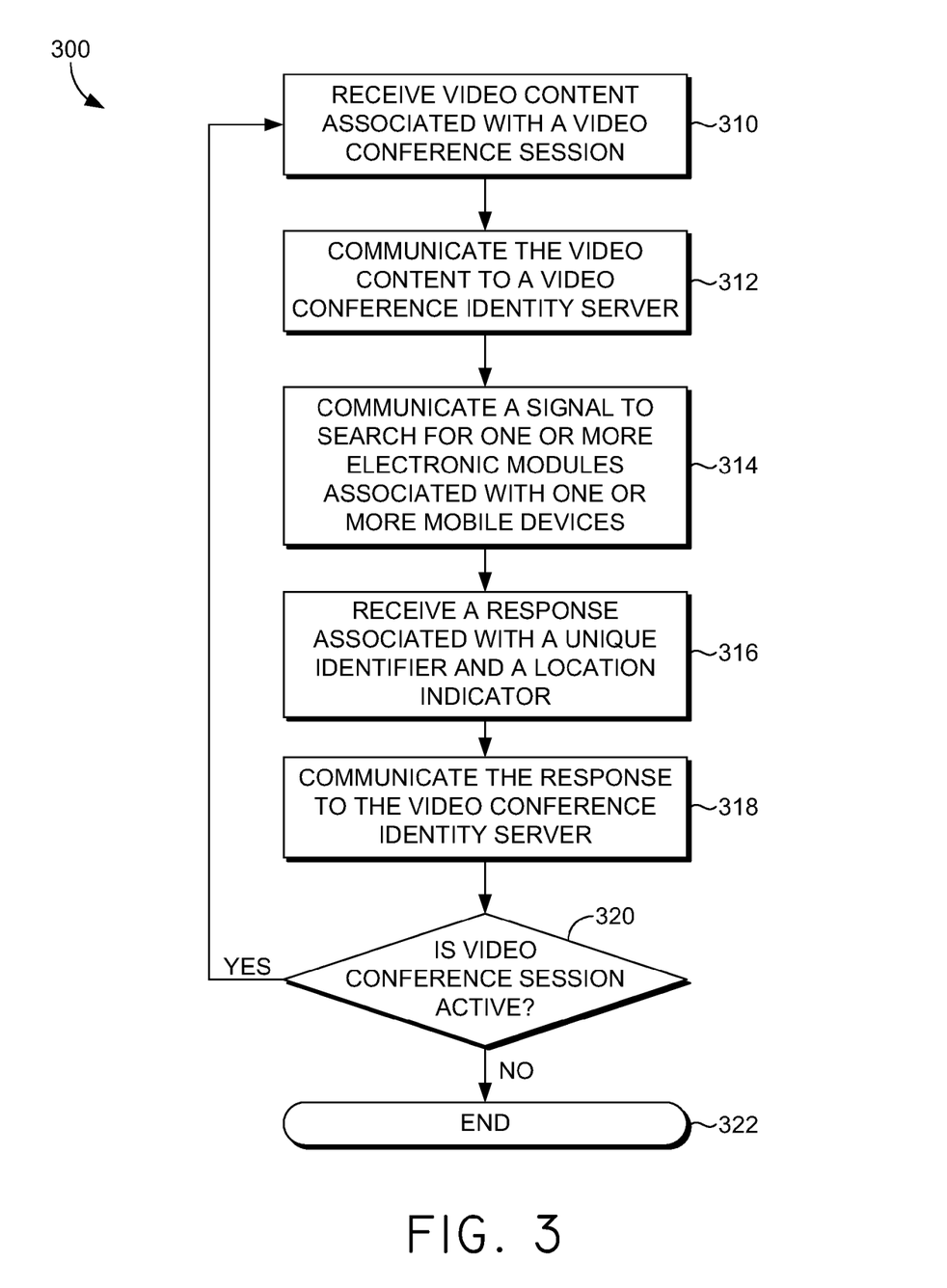
FIG. 3 provides an exemplary flow diagram illustrating a method for facilitating identification of a video conference participant(s), in accordance with an embodiment of the present invention.

By way of example only, and with reference to FIG. 3, an exemplary method 300 for identifying participants of a video conference session is provided. Initially, as indicated at block 310, video content associated with a video conference session is received. Such video content may be captured by a video camera that records participants of the video conference. Subsequently, at block 312, the video content is communicated to a video conference identity server. In embodiments, the video conference identity server is used to identify participants of the video conference. At block 314, a signal is communicated to search for one or more electronic modules associated with one or more mobile devices. In embodiments, a reader, such as a RFID reader, is utilized to broadcast signals.

A response is received that is associated with a unique identifier and a location indicator, as indicated at block 316. The response is received from a mobile device in response to the signal transmitted, for example, via a reader. As indicated at block 318, such a response is communicated to the video conference identity server. The video conference identity server can utilize data within the response as well as the video content received to identify participants of the video conference. At block 320, it is determined if the video conference session remains active. If the video conference session is no longer active, the method ends at block 322. If, however, if the video conference session remains active, the method continues to block 310 to receive video content.

Figure 4:
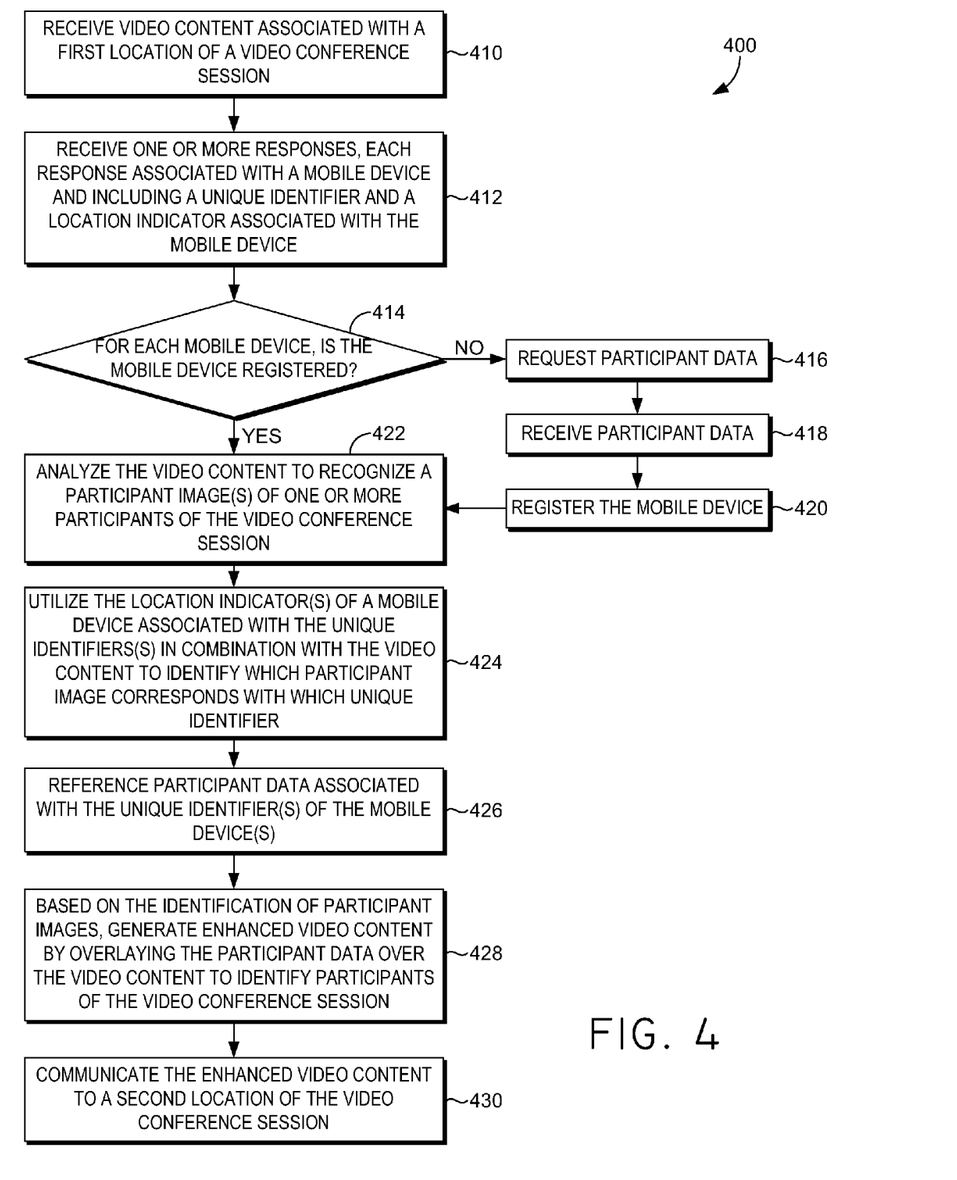
FIG. 4 provides an exemplary flow diagram illustrating a method for identifying video conference participants, in accordance with an embodiment of the present invention.

Turning to FIG. 4, an exemplary method 400 for identifying participants of a video conference session is provided. Initially, at block 410, video content associated with a first location of a video conference session is received. At block 412, one or more responses associated with a respective mobile device are received. Each of the one or more responses is associated with a unique identifier and a location indicator corresponding with the mobile device. As can be appreciated, the unique identifier and/or location indicator may additionally or alternatively be associated with an electronic module or user of the mobile device. At block 414, it is determined, for each mobile device, if the mobile device is registered. If it is determined that a mobile device(s) is not registered, participant data is requested at block 416. Subsequently, as indicated at block 418, participant data is received such that the mobile device can be registered at block 420.

Upon registering a mobile device(s) at block 420 or in cases that a determination is made at block 414 that a mobile device(s) is registered, the video content is analyzed to recognize a participant image(s) of one or more participants of the video conference session. At block 424, the location indicator(s) of the mobile device(s) associated with unique identifiers in combination with the video content is utilized to identify which participant image within the video content corresponds with which unique identifier. Participant data associated with the unique identifier(s) of the mobile device(s) is referenced, as indicated at block 426. Based on the identification of participant images, an enhanced video content is generated by overlaying the participant data over the video content to identify participants of the video conference session. In this regard, participant data corresponding with a particular participant is placed near the participant image in the enhanced video content. This is indicated at block 428. At block 430, the enhanced video content is communicated to a second location of the video conference session.

Figure 5:
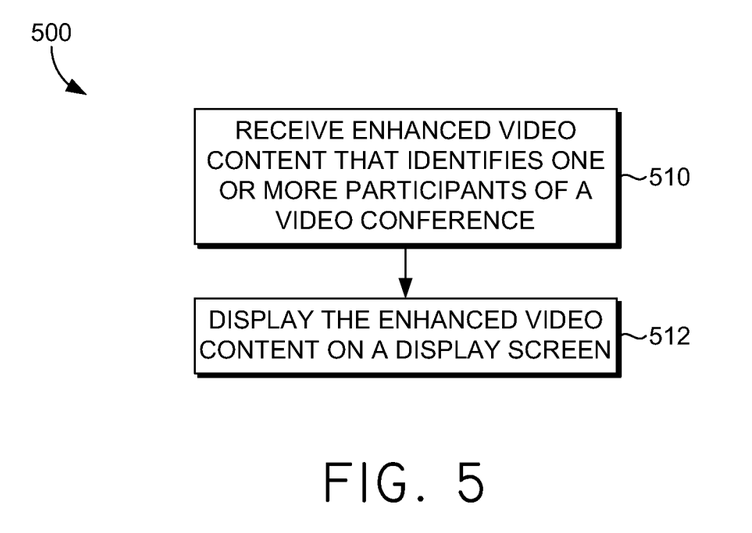
FIG. 5 illustrates an exemplary flow diagram illustrating a method for outputting enhanced video content, in accordance with an embodiment of the present invention.

With reference to FIG. 5, an exemplary method 500 for outputting enhanced video content is provided. Initially, at block 510, enhanced video content that identifies one or more participants of a video conference is received. Enhanced video content may generally include overlaying video content captured at a video conference session location having one or more participants with participant data such that the participant data is positioned near the appropriate participant image. At block 512, the enhanced video content is displayed on a display screen. Displaying the enhanced video content enables video conference participants located at another video conference session location to recognize participant data for the various participants of the video conference session remotely located. In addition to providing participant data for video conference participants, the enhanced video content provides the participant data near the corresponding participant image such that a viewer can recognize which participant data corresponds with which participant.

It will be understood by those of ordinary skill in the art that the order of steps shown in the method 300 of FIG. 3, method 400 of FIG. 4, and method 500 of FIG. 5 are not meant to limit the scope of the present invention in any way and, in fact, the steps may occur in a variety of different sequences within embodiments hereof. For example, with respect to FIG. 3, communicating a signal and receiving a response may occur prior to receiving video content. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need be carried out or need to be carried out in the specific order described.

The invention claimed is:

1. One or more non-transitory computer-readable media having computer-useable instructions embodied thereon for identifying participants of video conference sessions, the method comprising:

receiving enhanced video content that identifies a plurality of participants each at a particular location of a video conference session, each of the plurality of participants being associated with a mobile device, wherein a location of each of the plurality of participants within the enhanced video content is identified based on wireless communications from the mobile device, having an electronic module, associated with the corresponding participant, the wireless communications providing a location indication of the mobile device to indicate an approximate location of the corresponding participant; and displaying the enhanced video content on a display screen, wherein the enhanced video content includes video content captured by a video camera aggregated with participant data that provides an indication of at least one of the plurality of participants.

2. The media of claim 1, wherein the participant data comprises a participant name, a company of a participant, a job title of a participant, an age of a participant, an interest of a participant, a gender of a participant, a location of a participant, a security level associated with a participant, or a combination thereof.

3. The media of claim 1, wherein the electronic module comprises a radio frequency identification (RFID) tag.

4. The media of claim 1, wherein participant data is displayed near a participant image within the video content to which it corresponds.

5. The media of claim 1, wherein the wireless communications comprise a unique identifier that uniquely identifies the corresponding mobile device.

6. The media of claim 1, wherein the location indicator comprises a signal strength of the mobile device.

7. One or more non-transitory computer-readable media having computer-useable instructions embodied thereon for performing a method for identifying participants of video conference sessions, the method comprising:

receiving video content associated with a particular location of a video conference session, the video content including a participant image for each participant within the video content having a plurality of participants;

for each participant, receiving a unique identifier and a location indicator associated with a mobile device of the corresponding participant of the video conference session;

based on the unique identifier, determining that the mobile device is not registered;

communicating a registration request to request participant data pertaining to the participant;

receiving participant data that describes the participant;

utilizing the unique identifier and the location indicator associated with each mobile device to identify a location of each participant within the video content; and utilizing the participant data to provide an identification of the participant within the video content, the participant data being presented near the corresponding participant image within the video content.

8. The media of claim 7, wherein the participant data comprises a participant name, a company of a participant, a job title of a participant, an age of a participant, an interest of a participant, a gender of a participant, a location of a participant, a security level associated with a participant, or a combination thereof.

9. The media of claim 7, wherein the received participant data is provided by participant via the mobile device or the video manager.

10. The media of claim 7, wherein utilizing the participant data to provide the identification of the participant with the video content comprises overlaying the participant data over the video content.

11. The media of claim 10, wherein utilizing the participant data to provide the identification of the participant with the video content further comprises recognizing participant images within the video content.

12. The media of claim 7, wherein the identification of the participant is provided throughout the video conference session.

13. The media of claim 7 further comprising referencing a security-level associated with the participant and comparing the security-level to a predetermined security-level threshold to determine that the participant is not approved to participate in the video conference session.

14. The media of claim 13 further comprising providing a security alert that indicates that the participant is not approved to participant in the video conference session based on the security-level assigned to that participant.

15. A method for identifying participants of video conference sessions, the method comprising:

receiving video content associated with a first location of a video conference session, the video content including a first participant image that represents a first participant associated with a first mobile device and a second participant image that represents a second participant associated with a second mobile device;

receiving a first unique identifier and a first location indicator associated with the first mobile device; wherein the first unique identifier identifies the first mobile device;

receiving a second unique identifier and a second location indicator associated with the second mobile device; wherein the second unique identifier identifies the second mobile device;

utilizing the video content, the first location indicator, and the second location indicator to identify that the first participant image corresponds with the first unique identifier and that the second participant image corresponds with the second unique identifier;

referencing first participant data associated with the first unique identifier and second participant data associated with the second unique identifier;

generating enhanced video content by overlaying the first participant data and the second participant data over the video content such that the first participant data is positioned near the first participant image and the second participant data is positioned near the second participant image; and communicating the enhanced video content to a second location of the video conference session for display.

16. The method of claim 15, wherein the enhanced video content is generated throughout the video conference session.

17. The method of claim 15, wherein the enhanced video content is generated upon a request.

18. The method of claim 15, wherein image recognition, audio recognition, or a combination thereof, is utilized to generated the enhanced video content.

19. The method of claim 15, wherein the first unique identifier and the first location indicator are provided by the first mobile device in response to a signal from a reader at the first location of the video conference session.

20. The method of claim 15, wherein the first location indicator comprises a signal strength associated with communication between an electronic module within the mobile device and a reader within the first location of the video conference session.

* * * * *